Aug. 16, 1960  R. WEISS  2,949,073
REFLEX CAMERA

Filed April 7, 1958  3 Sheets-Sheet 1

Aug. 16, 1960     R. WEISS     2,949,073
REFLEX CAMERA
Filed April 7, 1958     3 Sheets-Sheet 3
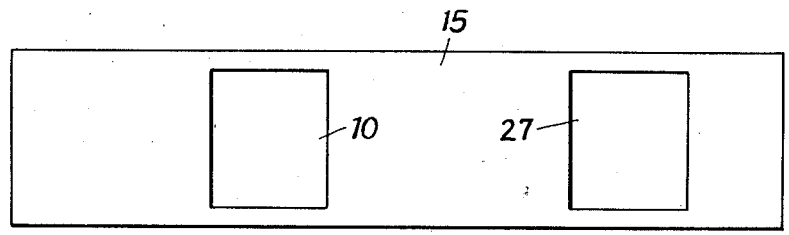
Fig.3
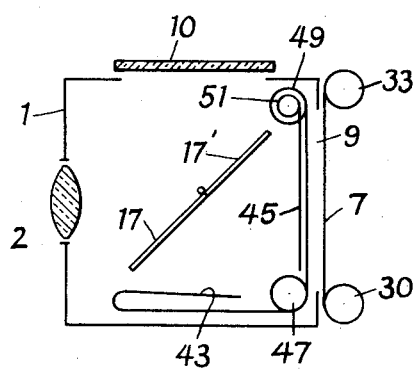 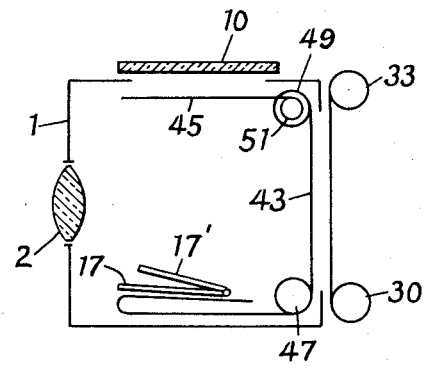
Fig.4          Fig.5
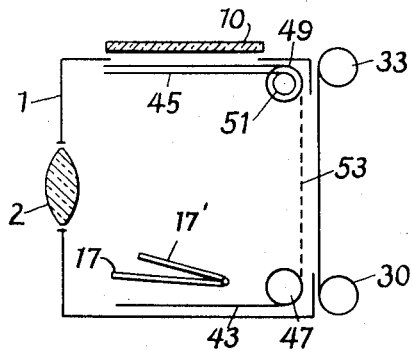 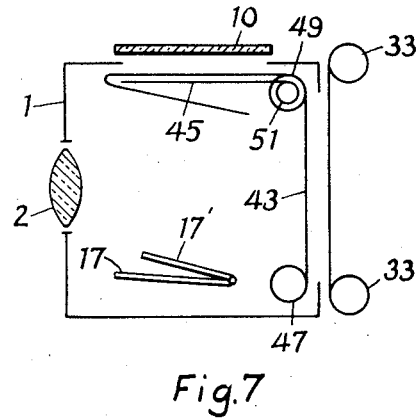
Fig.6          Fig.7

United States Patent Office 2,949,073
Patented Aug. 16, 1960

2,949,073

REFLEX CAMERA

Richard Weiss, Braunschweig, Germany, assignor to Franke & Heidecke, Fabrik Photographischer Präzisions-Apparate, Braunschweig, Germany, a firm Filed Apr. 7, 1958, Ser. No. 726,846

Claims priority, application Germany Apr. 12, 1957

8 Claims. (Cl. 95—42)

The present invention relates to reflex cameras and, more particularly, to a single lens pivoted mirror reflex camera.

An object of this invention is to provide a generally new and improved single lens reflex camera having a pivoted mirror.

Another object of this invention is to provide a new and improved single lens reflex camera having a pivoted mirror divided by a hinge arranged parallel to the pivotal axis of the mirror.

Yet another object is to provide a new and improved single lens reflex camera having a pivoted mirror divided by a hinge and adapted to be collapsed to a portion of its length by movement about a pivotal axis located at one side of the mirror.

A further object is the provision of a new and improved single lens reflex camera having a pivoted mirror divided by a hinge and adapted to be moved to a collapsed position beneath the objective and the cone of rays coming through the lens.

A still further object of the invention is the provision of a new and improved single lens reflex camera having a divided pivoted mirror whereby a relatively large mirror is provided while yet being arranged to collapse into a relatively small space located so as to not interfere with the exposure.

These and other desirable objects may be attained in the manner disclosed as an illustrative embodiment of the invention in the following description and in the accompanying drawings forming a part hereof, in which:

Fig. 3 is a plan view of an unfolded curtain used in the camera shown in Figs. 1 and 2;

Fig. 4 is a schematic view of a camera similar to that shown in Fig. 1 but embodying a different curtain arrangement; and Figs. 5, 6, and 7 are schematic views similar to Fig. 4 showing the curtain in other positions.

The same reference numerals throughout the several views indicate the same parts.

Figure 1:
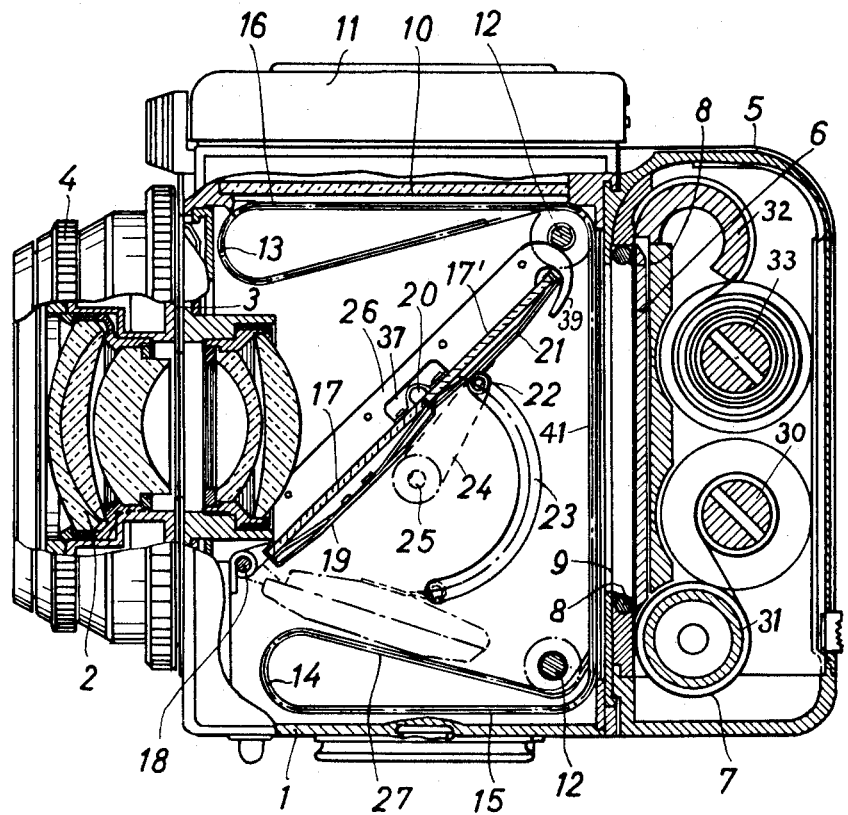
Fig. 1 is a cross-sectional view of a camera according to the invention showing the pivoted mirror in its focusing position.

In Fig. 1 is shown a single lens reflex camera according to the present invention having a housing 1. The front wall of the housing carries an objective 2 and a between-lens shutter 3 in a focusing mount 4. The objective 2, it is to be noted, extends rearwardly into the housing 1 a short distance as is the case with high-power objectives presently used. Mounted on the back wall of the housing is a removable roll film cassette 5 including a conventional pressure plate 6 which presses the film 7 against a pair of guide rollers 8 supported at opposing edges of an image aperture 9. The film 7, as is usual, passes from a supply roll 30 over a lower guide roller 31, between the pressure plate 6 and guide rollers 8, and thence over an upper curved deflector 32 to a rewind roll 33.

In the top wall of the camera housing 1 is mounted a focusing screen 10 (e.g., of ground glass), and above the screen 10 is supported a light hood 11 movable between a collapsed position and an open position when used for focusing purposes. The hood may be of any known form; e.g., the form disclosed in Bretthauer Patent 2,641,955, dated June 16, 1953. Image rays during focusing pass through the open shutter 3 and are reflected upwardly to the focusing screen 10 by a pivoted mirror having two hinged portions 17 and 17'. The mirror portions 17 and 17' are mounted on conventional supporting frames 19 and 21, respectively, and the mirror portions and frames are connected by a transversely extending hinge 20. The mirror and frames are divided approximately centrally, however, the lower portion 17 is desirably at least as wide as the upper portion 17' and is preferably wider, as shown.

The lower edge of the frame 19 carrying the mirror 17 is pivoted to the front wall of the housing 1 by a transversely extending hinge 18 located beneath the rearwardly projecting end of the objective 2. The mirrors 17 and 17' are arranged to be moved between an extended or focusing position as shown in full lines in Fig. 1 and a collapsed or exposure position as shown in dotted lines in Fig. 1. To this end, a pair of pins 22 are each rotatably supported in a cylindrical bearing carried by either side of the upper frame 21. The outer end of each pin 22 extends laterally into a guide groove 23 provided in either side wall of the housing 1. The guide grooves have an arcuate shape. The lower end of each groove supports the collapsed mirrors in a folded position extending downwardly and rearwardly from the horizontal. As will be clearer from the discussion to follow, the collapsed mirror occupies unused space in the camera housing below the cone of rays passing through the lens and toward the image aperture 9 during the exposure operation. The collapsed mirror also extends partially under the objective 2, thus allowing use of a relatively large objective without interfering with the mirror.

Figure 2:
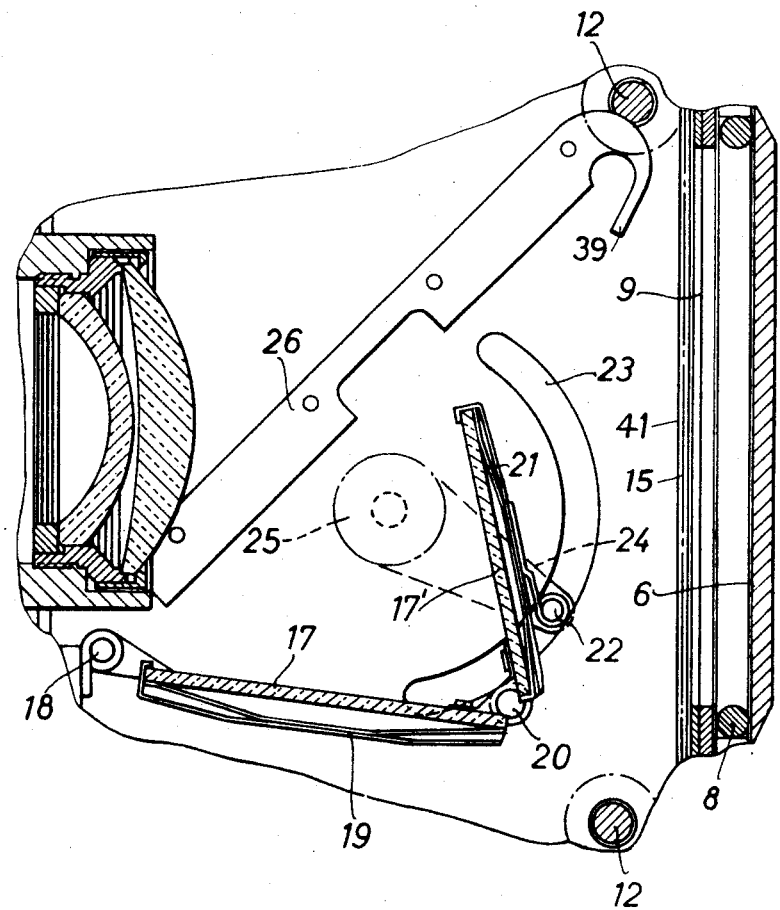
Fig. 2 is a fragmentary cross-sectional view of the camera of Fig. 1 showing the pivoted mirror during its movement to its collapsed or exposure position.

To move the pivoted mirror between its focusing and collapsed positions, a pair of crank arms 24 are provided, one at either side. Each crank arm 24 is fastened at one end to its respective pin or stud 22 and is secured at its other end to a crank pin 25 rotatably mounted on a side wall of the housing 1. By turning one or both of the crank pins 25, it can be seen that the mirror portions 17 and 17' are actuated to move from their focusing to their collasped positions or vice versa, the studs 22 riding along the arcuate grooves 23 (see Fig. 2). Of course, the grooves 23 are portions of circles concentric with the crank pins 25.

The movement of the pivoted mirror upwardly toward the focusing position is limited by the abutment of the pins 22 against the upper ends of the grooves 23. In addition, two stop rails 26 are provided, one at either side, each fastened to one of the housing side walls. Each stop rail has a centrally located recess 37 to allow room for the hinge 20. The upper end of each stop rail is hooked over and downwardly to provide a hook end 39. During the collapsing movement, the upper end of the mirror frame 21 abuts the hook end 39 and is momentarily held against downward and rearward swinging until the break occurs at the hinge 20. On movement to the focusing position, the edges of the mirror portions 17 and 17' abut the lower stop surfaces of the stop rails 26 so that the two mirror portions lie in a common plane.

As can be seen in Fig. 1, the pivoted mirror in its focusing position does not shield the portion of the film exposed to the image aperture 9. Furthermore, since the mirrors fold to a collapsed position below the objective 2, an arrangement must be provided for shielding the ground glass 10 while the film is being exposed. For this purpose, a curtain 15 is provided. At the top and bottom of the housing, the ends of the curtain 15 are movable within a pair of similar opposing guideways 13 and 14, respectively. Each guideway is preferably formed of a pair of spaced sheet metal flanges supported at either side by the housing side walls and projecting inwardly a short distance, though not so far as to overlap the ground glass 10 at the top. The guideways 13 and 14 each include a straight portion extending substantially parallel to the respective top or bottom wall which loops back upon itself in a rounded curve to allow smooth movement of the curtain without binding. The collapsed mirrors, it is to be noted, fit into the unused space above guideway 14 and below the image cone of rays. A similar guideway 41 is mounted at the rear of the side walls extending parallel to the back wall, and connects with the curved ends of guideways 13 and 14. The curtain 15 is moved within the guideways 13, 14, and 41 by a pair of transversely extending rollers 12 mounted at the corners of the back and top and bottom walls, these rollers being in driving engagement with the inner surface of the curtain.

As can be seen in Fig. 3, the curtain 15 has a pair of spaced rectangular openings 16 and 27. During the focusing operation, the curtain is located in such position that the opening 16 is beneath the focusing screen 10, so that the image from the objective 2 may be seen by the operator after reflection from the mirrors 17 and 17'. At this time the image aperture 9 is covered by the curtain, the unbroken opaque portion between the openings 16 and 27 being alined with the aperture 9. The opening 27 is located in a position with respect to the opening 16 such that the screen 10 is completely covered by the curtain before the opening 27 is moved to a position in front of the image aperture 9. During this time the shutter 3 is closed, of course, so that no light is entering the housing 1 when the opening 27 arrives at its exposure position uncovering the image aperture.

Desirably the curtain 15 is a serrated-metal type curtain conveniently driven in both directions by toothed rollers 12, but other types of curtains may be employed.

The pivoted mirror crank pins 25, the curtain rollers 12 and the shutter 3 are coupled to one another in a suitable manner to effect the sequence of operations to be described. This coupling mechanism may take a form similar to that shown in German Patent No. 666,457, published October 20, 1938. Upon advancing of the film or, alternatively, upon the cocking of the shutter, a suitable mechanism is provided to turn the rollers 12 to move the curtain 15 to a position covering the image aperture 9. Thereafter the crank pins 25 are automatically rotated to swing the pivoted mirrors from their collapsed position to the focusing position. At this point the rollers 12 have moved the curtain to the point at which the focusing screen 10 is uncovered by the opening 16. The shutter 3 is now automatically opened to allow image rays passing through the objective 2 to be reflected from the mirrors 17 and 17' to the screen 10, where the image may be viewed by the operator.

Upon actuation of the shutter release member, suitable mechanism is provided automatically to close the shutter 3, turn the rollers 12 to move the curtain 15 to a position covering the screen 10, and rotate the crank arms 24 to move the mirrors 17, 17' to their collapsed position. By this time the curtain has moved to the point where the image aperture 9 is uncovered by the opening 27. The shutter 3 is now released for the exposure.

Of course, the sequence of operations may be arranged to have a different order. Thus, the pivoted mirror may have a rest position as shown in full lines in Fig. 1, to which rest position the parts are returned after each exposure. For this sequence, a suitable mechanism is provided, so that when the film is wound, it tensions a power spring to perform the next cycle of operation but does not actually move either the mirror or the curtain. Then when the shutter release is actuated, the mechanism automatically will close the shutter, move the curtain to cover the screen, fold the mirror, uncover the image aperture, actuate the shutter for exposure, then move the curtain again to cover the image aperture, swing the mirror to focusing position, move the curtain to uncover the focusing screen, and open the shutter ready for focusing, thus completing the cycle and restoring all parts to rest position.

In the schematic view of Fig. 4, an alternative arrangement of the curtain is shown. This view shows diagrammatically the housing 1, objective 2, focusing screen 10, pivoted mirrors 17 and 17', image aperture 9, and film 7 wound on supply and rewind rollers. In this modified arrangement, a two part curtain is provided including an outer curtain 43 and an inner curtain 45. The outside curtain engages and is moved by a lower roller 47 and also by an upper roller 49. The inside curtain 45 is moved by an upper roller 51 mounted concentrically with the roller 49. Initially the image aperture 9 is covered by both curtains as shown in Fig. 4. Upon release of the shutter, a suitable mechanism is arranged to move the inner curtain 45 to a position covering the screen 10 while pivoting the mirrors 17, 17' to their collapsed position as shown in Fig. 5. Then the outside curtain 43, which has an opening 53, is moved so as to uncover the image aperture 9, the shutter being then released to make the exposure (see Fig. 6). The outside curtain 43 has further movement covering the image aperture 9, as shown in Fig. 7. Upon cocking of the shutter, the parts are restored to the focusing position of Fig. 4, but the curtain 45 remains closed until after the curtain 43 has moved back to its initial closed position.

If desired, the teaching of the present invention may be carried out using a focal plane shutter or a focal plane shutter combined with a covering curtain for the focusing screen, in which latter case the focal plane shutter may be a blade-type shutter, a pivoted shutter or a shutter similar to an iris diaphragm. Thus, the practice of the invention is not limited to a between-lens or objective shutter.

The pivoted mirror arrangement herein described is conveniently used with a between-lens shutter, because the placement of the hinge 18 below the objective 2 permits the use of modern high-power objectives, which often extend rearwardly into the housing a considerable distance. With the divided and hinged mirrors 17 and 17', the moving mass is subdivided and consequently the moments of inertia of the mirror are reduced and paths of travel are also shortened, so that a substantially easier movement is obtained than is the case with undivided pivoted mirrors, and with less noise of impact at the end of each movement. Since the divided mirrors 17, 17' do not effect light sealing of the focusing screen 10, great freedom of construction and design are permitted. A compact spatial arrangement within the camera is obtained inasmuch as the collapsed position of the mirrors is in unused space below the objective and the image cone of rays. A relatively large mirror may be used while yet being arranged to fold into a small space located so as not to interfere with the exposure.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A pivoted mirror reflex camera comprising a housing, means for holding film, means for admitting light into said housing to form an image on the film, a focusing screen mounted in said housing, a pivoted mirror for reflecting image rays onto said focusing screen, said mirror being divided into two portions, means for providing a pivotal axis along an outer edge of one of said portions, means for hinging said portions along an axis parallel to said pivotal axis, said mirror being movable between a focusing position wherein said two portions lie adjacent one another in substantially the same plane in an oblique orientation and a focusing position wherein said two portions are folded one upon the other in a space opposite said focusing screen, and means connected to the other of said two portions for guiding and moving said mirror between said positions.

2. A pivoted mirror reflex camera comprising a housing, means for holding film, a focusing screen mounted in said housing, an objective and an opposing image aperture carried by said housing, a pivoted mirror for reflecting image rays onto said focusing screen, said mirror being movable between a focusing position and a collapsed position, means for pivoting one edge of said mirror along a pivotal axis located below the objective, said mirror being divided into at least two portions and hinged along an axis parallel to said pivotal axis said portions lying in substantially the same plane arranged obliquely behind said objective when said mirror is in said focusing position and being folded one upon the other when said mirror is in said collapsed position, means for guiding and moving said mirror between said positions, and curtain means arranged to be coordinated with said means for guiding and moving said mirror so that said image aperture is covered when said mirror is in said focusing position and said focusing screen is covered when said mirror is in said collapsed position.

3. A construction as defined in claim 2, wherein said curtain means is provided by a single curtain having two spaced openings.

4. A construction as defined in claim 2, wherein said curtain means is provided by two separate curtains, one of said curtains having an image aperture opening.

5. A pivoted mirror reflex camera comprising a housing, means for holding film, a focusing screen mounted in said housing, an objective and an opposing image aperture carried by said housing, a pivoted mirror for reflecting image rays onto said focusing screen, said mirror being movable between a focusing position and a collapsed position, means fo pivoting one edge of said mirror along a pivotal axis located below the objective, said mirror being divided and hinged along an axis parallel to said pivotal axis, means carried by said side walls and the other of said portions for guiding and actuating the movement of said mirror between said positions, and curtain means arranged to be coordinated with said means for guiding and actuating the movement of said mirror so that said image aperture is covered and said focusing screen is uncovered when said mirror is in said focusing position and said focusing screen is uncovered and said image aperture is covered when said mirror is in said collapsed position.

6. A pivoted mirror reflex camera comprising a housing, means for holding film, shutter means, a focusing screen mounted in said housing, an objective and an image aperture carried by said housing, a pivoted mirror for reflecting image rays onto said focusing screen, said mirror being movable between a focusing position and a collapsed position and being divided into two portions, means for pivoting an edge of one of said portions to said housing on a pivotal axis located beneath said objective, means hinging said mirror portions along an axis parallel to said pivotal axis, said mirror portions lying in substantially the same plane arranged obliquely behind said objective when said mirror is in said focusing position and being folded upon one another in a space within said housing below said objective and opposite said focusing screen when said mirror is in said collapsed position, pin and slot means for guiding the movement of the other of said portions, means for moving said mirror between said positions, and flexible curtain means arranged to be coordinated with said means for moving said mirror so that said image aperture is covered when said mirror is in said focusing position and said focusing screen is covered when said mirror is in said collapsed position.

7. A pivoted mirror reflex camera comprising a housing, means for holding film, an objective and an opposing image aperture carried respectively by the front and back of said housing, said objective projecting inwardly a short distance into the interior of said housing, a focusing screen mounted in the top of said housing, a mirror for reflecting image rays from said objective onto said focusing screen, means for pivoting an outer edge of said mirror along a pivotal axis located beneath the inwardly projecting objective and extending between the sides of said housing, said mirror being divided into two portions and hinged along an axis substantially parallel to said pivotal axis, means for moving said mirror between a focusing position wherein said two portions lie adjacent one another in substantially the same plane arranged obliquely behind said objective and a collapsed position wherein said two portions are folded one upon the other, said mirror in said collapsed position lying in a space within said housing below said objective and opposite said focusing screen.

8. A pivoted mirror reflex camera comprising a housing, means for holding film, an objective and an opposing image aperture carried respectively by the front and back of said housing, a focusing screen mounted in the top of said housing, a mirror for reflecting image rays from said objective onto said focusing screen, said mirror being divided into two portions and hinged along an axis extending between the sides of said housing, means for pivoting an outer forward edge of one of said mirror portions beneath said objective along a pivotal axis substantially parallel to said hinged axis, said mirror being movable between a focusing position wherein said two portions lie adjacent one another in substantially the same plane arranged obliquely behind said objective and a collapsed position wherein said two portions are folded one upon the other in a space below said objective, means for guiding the other of said two mirror portions for movement between said positions, and a crank arm pivoted to the other of said two mirror portions for actuating the movement of both of said mirror portions between said positions.

References Cited in the file of this patent

UNITED STATES PATENTS 1,012,603   Core _____ Dec. 26, 1911

FOREIGN PATENTS 880,997   Germany _____ June 25, 1953